No. 794,363. PATENTED JULY 11, 1905.
B. G. LAMME.
ELECTRIC MOTOR AND CONTROLLING MEANS THEREFOR.
APPLICATION FILED JAN. 3, 1905.

WITNESSES:
Fred. H. Miller
Otto S. Schairer

INVENTOR
Benjamin G. Lamme
BY
Wesley G. Carr
ATTORNEY

No. 794,363. Patented July 11, 1905.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR AND CONTROLLING MEANS THEREFOR.

SPECIFICATION forming part of Letters Patent No. 794,363, dated July 11, 1905.

Application filed January 3, 1905. Serial No. 239,520.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electric Motors and Controlling Means Therefor, of which the following is a specification.

My invention relates to electric motors and controlling means for such motors; and it has for its object to provide means for automatically changing the value of the ampere-turns in the field-magnet winding of a motor when the character of the energy supplied to drive the motor is changed from direct to alternating current, and vice versa.

Electric motors may be constructed which will operate satisfactorily when supplied with either alternating or direct currents, but such motors do not ordinarily operate equally well under both conditions for the reason that when operated by alternating currents it is desirable that the ampere-turns in the field-magnet windings shall be relatively low and that when operated by direct currents the ampere-turns in the field-magnet windings shall be considerably higher in value. I have found that by making use of suitable combinations of reactance and resistance windings having different time constants it is possible to provide different conditions of operation for the two kinds of currents, by virtue of which a higher value for the ampere-turns in the field-magnet windings may be obtained when the motor is operated by direct currents than when it is operated by alternating currents. I have set forth one such means in my application Serial No. 206,186, filed May 3, 1904, and my present invention constitutes an improvement upon that set forth in the said prior application.

My invention is illustrated in the accompanying drawings, in which—

Figure 1:
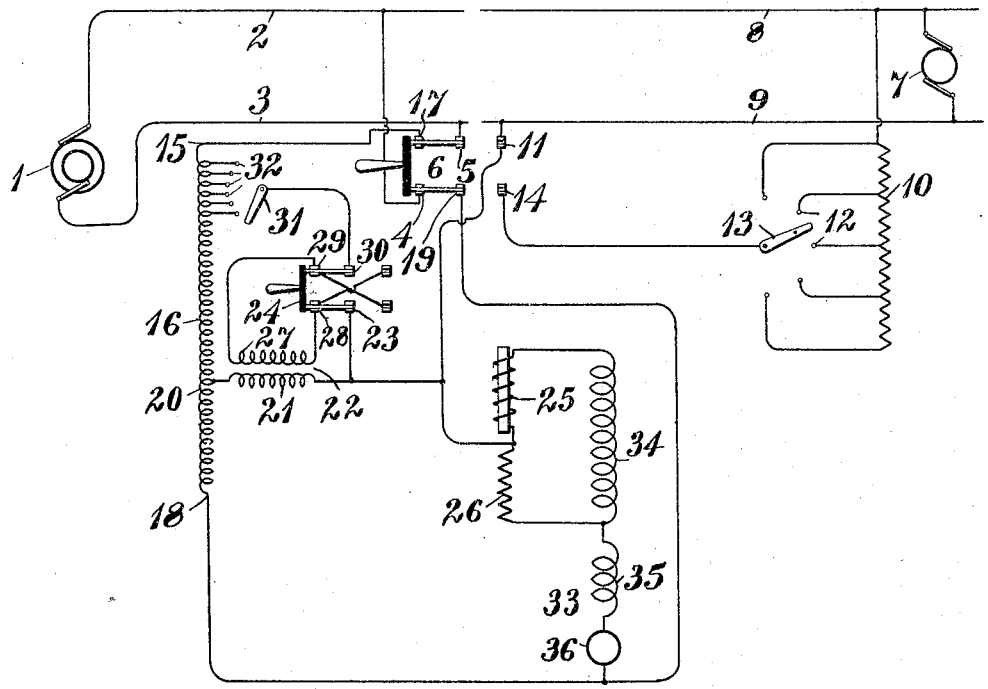
Figure 2:
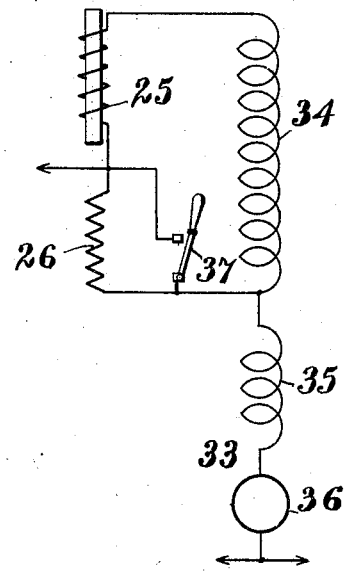

Figure 1 is a diagram of a system embodying the invention, and Fig. 2 is a diagram corresponding to a portion of the system illustrated in Fig. 1 and setting forth a modification.

Alternating-current energy is supplied from a suitable generator 1 to distributing-conductors 2 and 3, which are respectively connected with terminals 4 and 5 of a double-throw switch 6, and direct-current energy is supplied from a suitable generator 7 to distributing-conductors 8 and 9, which are respectively connected to one terminal of a subdivided resistance element 10 and to a terminal 11 of the switch 6. The various subdivisions of the resistance element 10 are connected, respectively, to contact-terminal pieces 12, with which a contact-arm 13 is adapted to engage, the arm being connected to a terminal 14 of the switch 6. The parts 10, 12, and 13 constitute the elements of the controlling system that pertain to direct-current operation of motors and are intended to be merely indicative of any operative means that is suitable for direct-current service.

The controlling apparatus that is intended for use in connection with alternating-current operation of motors will be now described in conjunction with the apparatus that is used in connection with both direct and alternating current operation.

One terminal 15 of a transformer-winding 16 is connected to contact-terminal 17 of the switch 6, and the other terminal 18 of the transformer-winding 16 is connected to terminal 19 of the switch 6. Connected to a point 20 that is suitably located intermediate the end terminals of the winding 16 is one terminal of the secondary winding 21 of a series transformer 22, the other terminal of the winding 21 being connected to terminal 23 of a switch 24 and also to the terminal 11 of the switch 6 and to terminals of an inductive or reactance coil 25 and a non-inductive resistance 26 that are connected together. The terminals of the primary winding 27 of the series transformer 22 are connected, respectively, to terminals 28 and 29 of the switch 24, and terminal 30 of the switch 24 is connected to a switch-arm 31, that serves to make connection with any one of several spaced leads 32, with which the transformer-winding 16 is provided.

The field-magnet winding of a motor 33 is composed of two sections 34 and 35, the section 34 having more turns than the section 35. One terminal of the section 34 of the field-magnet winding is connected to one terminal of the choke-coil 25, and the other terminal is connected both to one terminal of the part 35 and to one terminal of the resistance 26. The other terminal of the part 35 is connected to the armature 36, the other terminal of which is connected to the terminal 18 of the transformer-winding 16 and to the terminal 19 of the switch 6.

Assuming that the switch 6 is in the position shown in the drawings, alternating current will be supplied to the motor 33, and nearly all of it will pass through the resistance 26 and the section 35 of the field-magnet winding provided the choking effect of the coil 25 is made sufficiently high. The phase relation between the current and the impressed electromotive force in the section 35 will be slightly different from that which obtains in the section 34; but as the current passing through the resistance 26 will be very much larger than that through the field-magnet winding 34 the field strength of the motor will be due almost entirely to the winding 35. It follows, therefore, that the field and armature strengths will be substantially in phase and that the ampere-turns of the field-magnet will be relatively small as compared with direct-current operation. If direct current is supplied to the motor, it will flow mainly through the choke-coil 25 and both field-magnet windings 34 and 35, provided the choke-coil is made of comparatively low ohmic resistance, so as to furnish but little opposition to the flow of current, and also provided the resistance 26 presents a greater opposition to the flow of direct current than is presented by the choke-coil 25 and the field-magnet winding 34. It follows, with these conditions, that all of the current supplied to the armature will pass through the field-magnet winding 35 and a considerable portion of it will pass through the winding 34. Hence the entire field-magnet strength will be very much greater than when the motor is operated by means of alternating current.

In order to insure the most effective operation, the resistance of the element 26 should be high as compared with that of the choke-coil 25 when utilizing direct current; but when utilizing alternating current the resistance of the coil 26 should be as small as possible. The lower this resistance to the passage of alternating currents the better. It may therefore be so arranged that the resistance 26 will be short-circuited when the motor is operated by alternating currents, and when operated by direct currents the short-circuiting device may be opened. This arrangement I have illustrated in Fig. 2, in which the several elements remain the same as in Fig. 1 so far as they are illustrated, except that a switch 37 is provided, which is closed to short-circuit the resistance-coil 26 when alternating currents are supplied to the motor 33 and is opened when direct currents are supplied to the motor. The choke-coil 25 may also be short-circuited when the motor is operated by direct currents, if desired; but there can be no objection to maintaining it in circuit at all times if it is made of suitable carrying capacity.

While the system shown in Fig. 1 embodies only a single motor, it is to be understood that a plurality of motors may be employed the windings of which are connected in any manner known in the art not inconsistent with what is here shown and described as constituting my present invention.

The devices shown in Fig. 1 for varying the voltages supplied to the motor are also presented merely as suitable means for the purpose and without any intention of limiting the invention to any specific means for insuring the desired voltage changes.

I claim as my invention—

1. The combination with a source of alternating-current energy, a source of direct-current energy, and a motor having series-connected armature and field-magnet windings, of means for automatically causing the ampere-turns in the field-magnet winding to assume a higher value when the motor is operated by direct currents than when it is operated by alternating currents, said means comprising an induction-coil and an ohmic-resistance element having their adjacent terminals connected together and to one of the sources of energy and having their other terminals connected respectively to one terminal of the field-magnet winding and to an intermediate point in said winding.

2. The combination with a motor having series-connected armature and field-magnet windings, of an inductive winding and a non-inductive resistance which are connected in series with each other and have their inner terminals connected to a source of energy and their outer terminals respectively connected to the outer terminal of the field-magnet winding and to a point intermediate its ends.

3. The combination with a motor having series-connected armature and field-magnet windings, of an inductive winding and a non-inductive resistance two of the terminals of which are connected together and to a source of energy and the other terminals of which are respectively connected to the outer terminal of the field-magnet winding of the motor and to a point therein that is intermediate its armature connection and its middle point.

4. The combination with a series motor of the commutator type adapted for operation by either alternating or direct currents, of an inductive winding and a non-inductive resistance element two of the terminals of which are connected together and the other two of which are respectively connected to the outer terminal of the field-magnet winding and to a point therein which is intermediate its armature connection and its middle point, the said resistance members and the motor being connected to the supply-circuit by means of conductors which respectively lead from the outer armature-terminal and from the interconnected terminals of the resistance members.

5. The combination with a source of alternating-current energy and a source of direct-current energy, of a motor having series-connected armature and field-magnet windings, an inductive winding and a non-inductive resistance, two of the terminals of which are connected together and the other two of which are connected, respectively, to the outer terminal of the field-magnet winding and to an intermediate point thereof, said means being so connected to the supply-circuit as to place the non-inductive resistance in shunt relation to the inductive resistance and that portion of the field-magnet winding to which said inductive resistance is directly connected.

6. The combination with a source of alternating-current energy and a source of direct-current energy, of a motor having series-connected armature and field-magnet windings, an inductive winding and a non-inductive resistance, the adjacent terminals of which are connected together and the remote terminals of which are connected respectively to that terminal of the field-magnet winding which is remote from the armature and to a point in the said winding that is intermediate its middle point and the armature, and means for so connecting the motor and resistances with either of the sources of energy as to place the non-inductive resistance in shunt relation to the inductive winding and that portion of the field-magnet winding to which said inductive winding is directly connected.

7. The combination with a source of alternating-current energy and a source of direct-current energy, of a motor having series-connected armature and field-magnet windings, an inductive winding and a non-inductive resistance having their adjacent terminals connected together and their remote terminals connected respectively to the outer terminal of the field-magnet winding and to an intermediate point thereof, means for so connecting the combined motor and resistances with their sources of energy as to place the non-inductive resistance in shunt relation to the inductive resistance and that portion of the field-magnet winding which is directly connected thereto, and means for establishing a shunt around one of the resistances when connection is made with one of the sources of energy and for opening the said shunt when connection is made to the other source of energy.

8. The combination with a source of alternating-current energy and a source of direct-current energy, of a motor having series-connected armature and field-magnet windings, an inductive winding and a non-inductive resistance having their adjacent terminals connected together and their remote terminals connected respectively to the outer terminal of the field-magnet winding and to an intermediate point thereof, means for so connecting the combined motor and resistances to their sources of energy as to place the non-inductive resistance in shunt relation to the inductive resistance and that portion of the field-magnet winding which is directly connected thereto, means for establishing a shunt around the non-inductive resistance when connection is made to the source of alternating-current energy, and means for interrupting the said shunt when connection is made to the source of direct-current energy.

In testimony whereof I have hereunto subscribed my name this 30th day of December, 1904.

BENJ. G. LAMME.

Witnesses:
 OTTO S. SCHAIRER,
 BIRNEY HINES.